No. 655,786. Patented Aug. 14, 1900.
G. LANINO.
VEHICLE.
(Application filed Dec. 5, 1899.)
(No Model.) 2 Sheets—Sheet 2.
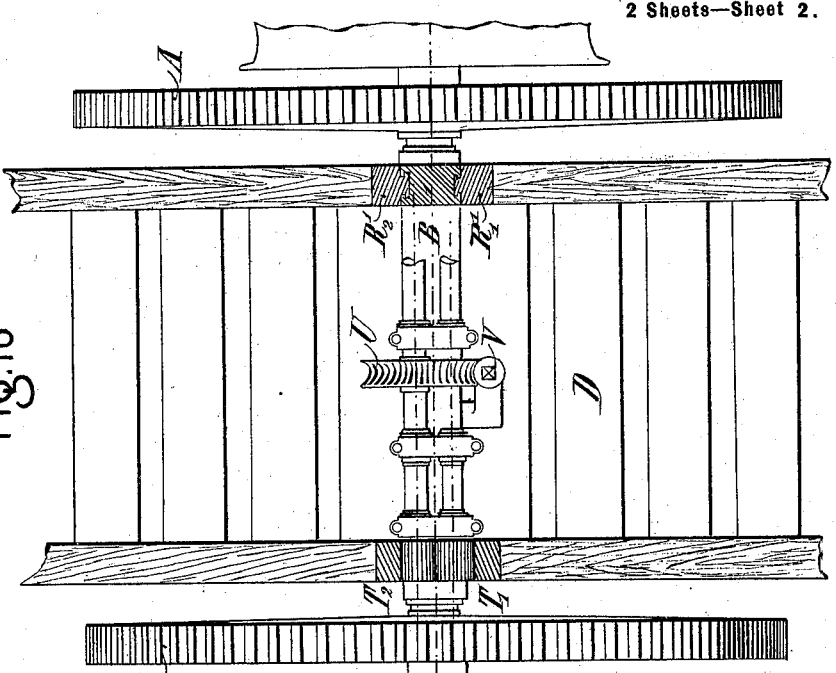
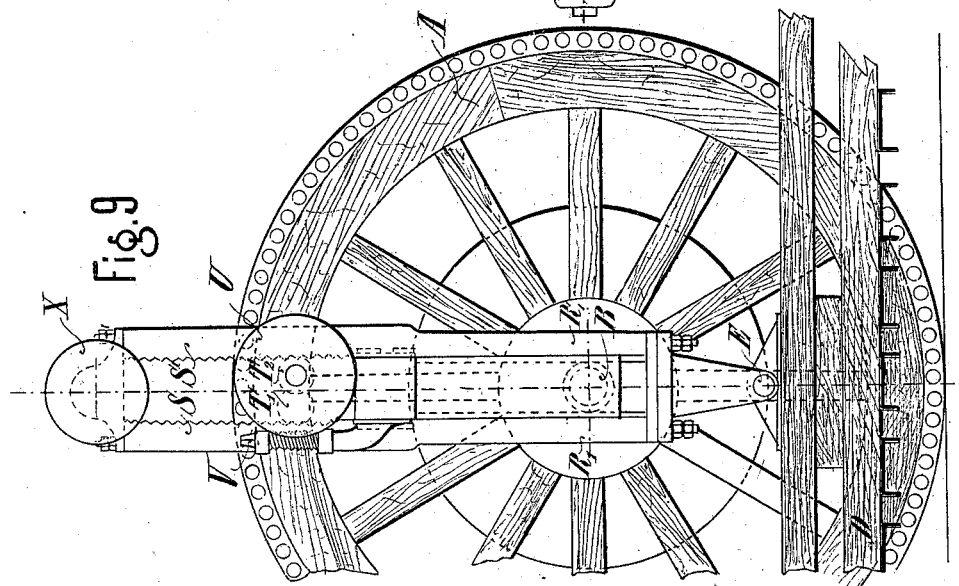

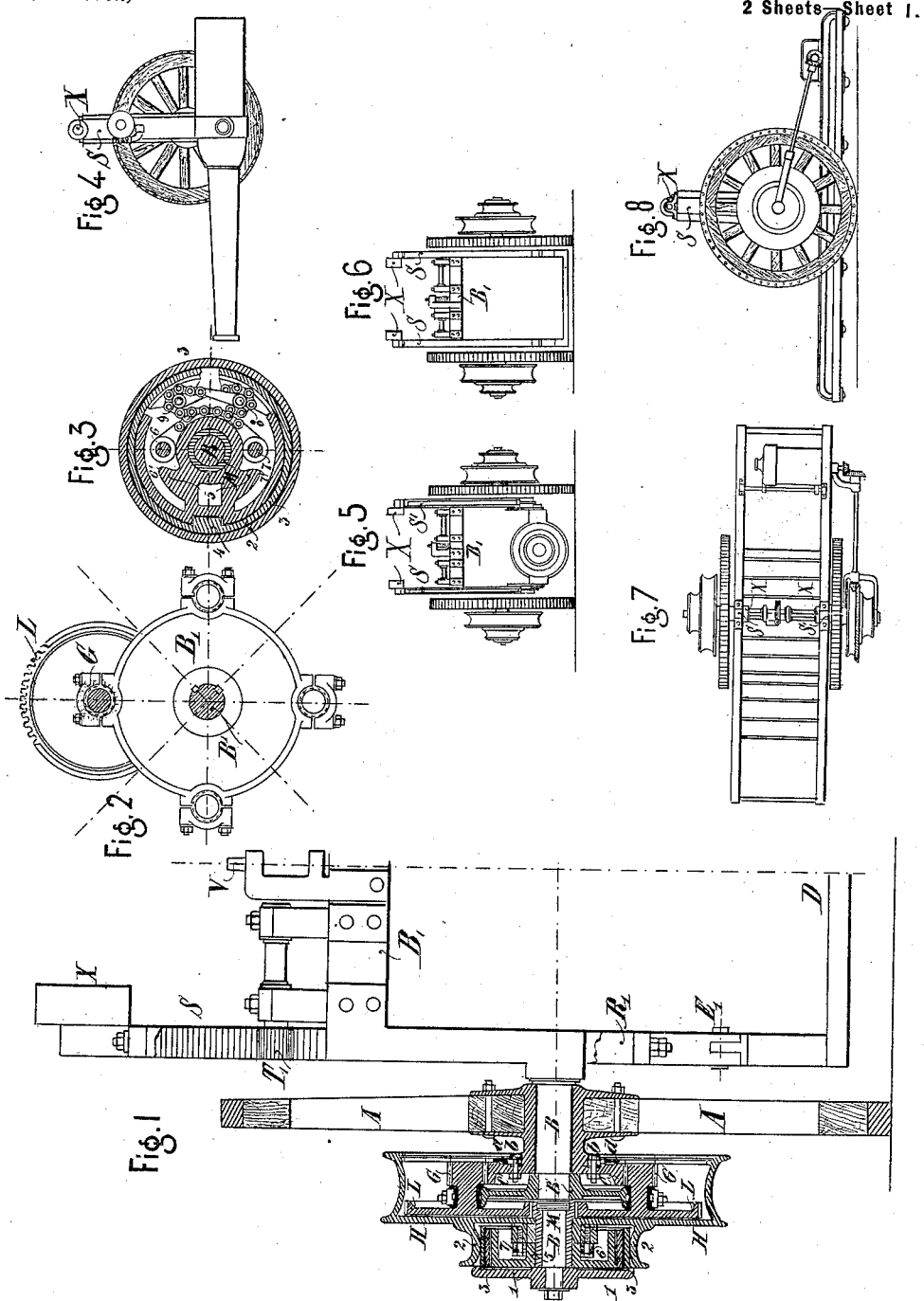

UNITED STATES PATENT OFFICE.

GIUSTO LANINO, OF TURIN, ITALY.

VEHICLE.

SPECIFICATION forming part of Letters Patent No. 655,786, dated August 14, 1900.

Application filed December 5, 1899. Serial No. 739,306. (No model.)

*To all whom it may concern:*

Be it known that I, GIUSTO LANINO, a subject of the King of Italy, residing at Turin, Italy, have invented certain new and useful Improvements in Vehicles, of which the following is a specification.

The present invention relates to a two-wheeled vehicle adapted particularly for the transportation of heavy loads and requiring a minimum amount of power, even on heavy grades. It is an improvement on the form of vehicle shown in Italian patent dated August 27, 1898, and operates on the same principle.

In the drawings, Figure 1 is an end elevation, partly in section. Figs. 2 and 3 are details. Figs. 4 to 8 show different ways of using the invention. Fig. 9 is a side view of Fig. 1, and Fig. 10 a plan of Fig. 9.

The running-wheels A are loose on the axle B and carry each a toothed concentric pinion C, Fig. 1, with which two or more pinions G, Fig. 2, gear, forming a part of as many toothed wheels L and having the same axis. These wheels are carried by a plate B', keyed on the axle B. All the wheels L gear with a loose pinion M, mounted on the axle B. This pinion is joined by means of a reaction or "Megy" brake 2 3 1 5 to the stepped pulley H, which has two grooved peripheries of different diameters. The pulley H is arranged in such a manner that its inside wall works at $d$ with soft friction on the hub of the wheel A and covers the mechanism, thus protecting it from dust and rain. The truck D is hung on two jambs or posts E' E², journaled at the extremity of two frames, each consisting of two vertical posts R' R² R' R², Figs. 9 and 10, connected at their extremities, the upper parts having racks S' S² S' S², which gear with the pinions T' T² T' T² on the frame B B B. The pinions T² are of one piece with a pinion U and have the same axis as this pinion, with helicoidal teeth, and the pinion U is controlled by a screw V, worked by hand. This construction serves the purpose of regulating the distance of the load from the ground and the axle of the vehicle. Owing to this arrangement the distance between the center of gravity and the center of rotation (gyration) of the vehicle can be varied.

Aside from the action of the brake 1 2 3 5, which will be taken into consideration later on, the vehicle operates as follows: By rolling a cord on one or the other groove of the pulley H, according to the strain required, and by drawing upon the cord the pulley and the pinion M, which belongs to it, are turned. This pinion M moves the wheels L and the pinions G belonging thereto, which run upon the pinion C and determine the rotation of the part B' and the axle B. The weight carried by the truck takes part in this rotation and is lifted toward the front and out of a vertical line directly beneath the vehicle, and when the center of gravity of the car is sufficiently far from the vertical or plumb line which passes through the point of contact of the wheels with the ground the car starts to move. This means that the platform B' stops, the pinions G cease to roll around C and move the latter around B, and the pinion C carries along the rolling-wheels A, which start the car. The force applied to the pulley H serves only to insure the maintenance of this movement. The mechanism thereafter realizes the application of the winch as the strain is transmitted from the pulley H to the running-wheel A, increased in the relation of the diameters of the different pinions.

The use of the brake 1 2 3 5 between the pinion M and the pulley H serves to prevent the car from running back when for any reason the traction strain on the pulley ceases.

The brake represented in the drawings is of the Megy system. It consists of a cap 1, keyed on the axle B, against the crown 2 of which, Figs. 1 and 3, presses strongly an annular spring 3 by the action of the elasticity and by means of a layer of material of considerable friction. This spring is held in the system 5, keyed on the nave of the pinion M, by means of the catch 4 or a similar means. The pulley H carries two pulleys 6 and 7, Fig. 3. The roller or pulley 6 holds the end of a chain (in the manner shown in Fig. 3) which rolls up on the pulley 8 and is carried by one of the extremities of the spring 3 and attached by the other end to the pulley 9, carried by the other extremity of the spring 3. The pulley 7 is similarly fixed at one of the ends of a chain which rolls up on the pulley 9 and is attached by its other end to the pulley 8. When traction is exercised on the pulley H, the two pulleys 6 and 7 start to turn, and according to the direction of the movement and by pulling the chain to which each is fixed one or the other brings the two pulleys 9 and 8 nearer to each other. By approaching these pulleys and the extremities of the spring 3 the latter ceases to press on the ring 2 and a good part of its surface comes to lie on the organ 5. In this organ two hollows or grooves 6' 7' have been provided, which are respectively in front of the rollers 6 and 7 at such a distance that as soon as the extremities of the spring have been approached as near as required the one of the two pulleys 6 7 which has exercised the traction steps into the corresponding hollow. Under these conditions the spring 3 is completely detached from the cap 2 and the pulley is fixed with the piece 5 and the spring 3. While the rotation continues, the pulley H carries along the pinion M and starts the car in the manner stated. When the traction strain on the pulley H ceases, the spring 3 stretches and adheres to the ring 2, thus fixing it with the system 5 and the pinion M, and consequently the whole mechanism is braked immediately.

Figs. 6, 7, and 8 represent a car intended to carry any load, and Figs. 4 and 5 show a carriage intended to transport a cannon, the described mechanism being applied in either case.

Figs. 7 and 8 indicate in diagram how a motor could be adapted by placing it on the truck-frame. The wheels X, placed at the top of the racks S, which regulate the position of weight, serve to form a prop for the car when it is reversed until they touch the ground, when such action becomes necessary. The system described accomplishes two essential conditions for cars of this kind. One condition is that the greatest possible space is left free between the two wheels, so that it can be occupied by the load to carry. The other condition is to have the point of application or working point of the outside force at a constant distance from the axle of the vehicle. The utility of this second condition rests on the fact that in case of hand traction any shifting of the working point is a serious inconvenience to the man who pulls the car, and where a motor is employed it is necessary that, notwithstanding the oscillations of the motor-frame, the multiplying mechanism remains in contact with the motor organ which imparts energy to it.

Where a motor is employed, there must naturally be added an arrangement for directing the vehicle—for instance, a mechanism by which the speed of the wheels can be regulated in their relation to each other or some other practical means for that purpose.

I claim—

1. In a two-wheeled carriage, a pair of carrying-wheels, a depressed main frame having axles upon which said wheels are journaled, pulleys carried by said axles and connected with said wheels, and a movable load-carrying frame, substantially as described.

2. In a two-wheeled carriage, a pair of carrying-wheels, a depressed frame having axles upon which said wheels are journaled, said axles projecting through the wheels, pulleys journaled upon said extended portions, and gearing connecting said pulleys with the wheels, substantially as described.

In witness whereof I have hereunto set my hand in presence of two witnesses.

GIUSTO LANINO.

Witnesses:
MARIO CAPUCCIO,
FELICE BAZETTA.